UNITED STATES PATENT OFFICE.

EMIL FISCHER, OF BERLIN, GERMANY, ASSIGNOR TO SYNTHETIC PATENTS CO., INC., OF NEW YORK, N. Y., A CORPORATION OF NEW YORK.

PHENYLPROPIOLIC-ACID COMPOUNDS CONTAINING ARSENIC.

1,191,580.     Specification of Letters Patent.     Patented July 18, 1916.

No Drawing. Original application filed November 27, 1914, Serial No. 874,308. Divided and this application filed November 2, 1915. Serial No. 59,287.

*To all whom it may concern:*

Be it known that I, EMIL FISCHER, doctor of philosophy, professor of chemistry, citizen of the German Empire, residing at Berlin, Germany, have invented new and useful Improvements in Phenylpropiolic-Acid Compounds Containing Arsenic, of which the following is a specification.

This invention relates to new phenylpropiolic acid

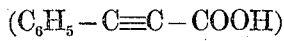

$$(C_6H_5-C{\equiv}C-COOH)$$

compounds containing arsenic and to a process of making them.

The new compounds are produced, generally speaking, by combining a halogen compound of arsenic with phenylpropiolic acid, and treating the resulting product with weak alkalis. By this treatment the halogen, which first combines with the phenylpropiolic acid, is split off and the new products are obtained in the form of their salts.

This application is a division of application Serial No. 874,308, filed November 27, 1914.

In order to illustrate the new process more fully the following example is given, the parts being by weight:—20 parts of phenylpropiolic acid and 50 parts of arsenic trichlorid ($AsCl_3$) are heated during 24 hours to 100° C. From this mass of the reaction the intermediate product separates in the shape of leaflets which are washed with ether and recrystallized from this liquid. Colorless crystals result containing about 16 per cent. arsenic and 14.5 per cent. chlorin. One part of this product is then dissolved at 0° C. in 8 parts of 1.5 normal caustic potash lye. Into the filtered liquid a current of $CO_2$ is introduced. A crystalline precipitate being an acid potassium salt containing water of crystallization separates, which is collected on a filter and is recrystallized by dissolving 1 part of it in 10 parts of hot water. After drying, the salt is a white or colorless powder very difficultly soluble in cold water, more easily soluble in boiling water, and containing (after being freed from the water of crystallization) about 17 per cent. of arsenic and being free from halogen. By the addition of hydrochloric acid to the water solution of the potassium salt the free acid is precipitated; recrystallized from dilute alcohol, it is obtained in small, colorless crystals which are easily soluble in alcohol, almost insoluble in water and do not melt when heated to 250° C. On being heated with an excess of alkali on the water bath $As_2O_3$ is split off.

I claim:—

1. The hereindescribed new phenylpropiolic acid compounds containing arsenic, obtainable by combining a halogen compound of arsenic with phenylpropiolic acid and then splitting off the halogen, the new compounds yielding an oxid of arsenic when heated with an excess of alkali and being in the form of the free acid colorless crystals easily soluble in alcohol and almost insoluble in water, substantially as described.

2. The hereindescribed new phenylpropiolic acid compounds containing arsenic which are when dried and freed from water of crystallization substantially colorless powders containing about 17 per cent. of arsenic, which is split off in the form of oxid of arsenic upon heating the compounds with an excess of alkali, substantially as described.

In testimony whereof I have hereunto set my hand in the presence of two subscribing witnesses.

EMIL FISCHER.

Witnesses:
    HENRY HASPER,
    ARTUR SCHROEDER.